United States Patent
Priedeman, Jr. et al.

(10) Patent No.: US 7,255,821 B2
(45) Date of Patent: *Aug. 14, 2007

(54) LAYERED DEPOSITION BRIDGE TOOLING

(75) Inventors: William R. Priedeman, Jr., Long Lake, MN (US); Steven Scott Crump, Wayzata, MN (US)

(73) Assignee: Stratasys, Inc., Eden Prairie, MN (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/511,783

(22) PCT Filed: Apr. 4, 2003

(86) PCT No.: PCT/US03/10219

§ 371 (c)(1),
(2), (4) Date: Aug. 8, 2005

(87) PCT Pub. No.: WO03/089215

PCT Pub. Date: Oct. 30, 2003

(65) Prior Publication Data

US 2006/0001190 A1    Jan. 5, 2006

Related U.S. Application Data

(60) Provisional application No. 60/373,236, filed on Apr. 17, 2002.

(51) Int. Cl.
B29C 33/38 (2006.01)

(52) U.S. Cl. ............... 264/219; 264/220; 264/225; 264/317; 264/401

(58) Field of Classification Search ........... 264/219, 264/220, 225, 317, 401
See application file for complete search history.

(56) References Cited

U.S. PATENT DOCUMENTS

| | | | |
|---|---|---|---|
| 3,930,061 A | 12/1975 | Scharfenberger | |
| 5,121,329 A * | 6/1992 | Crump | ................ 700/119 |
| 5,189,781 A | 3/1993 | Weiss et al. | |
| 5,591,563 A | 1/1997 | Suzuki et al. | |
| 5,744,697 A | 4/1998 | Martell et al. | |
| 5,938,876 A | 8/1999 | Edwards et al. | |
| 5,952,018 A * | 9/1999 | Beldue et al. | ............ 425/556 |
| 6,001,298 A | 12/1999 | McAloon | |
| 6,159,407 A | 12/2000 | Krinke et al. | |
| 6,287,428 B1 | 9/2001 | Gale et al. | |
| 6,355,196 B1 | 3/2002 | Kotnis et al. | |
| 6,790,403 B1 * | 9/2004 | Priedeman et al. | ......... 264/442 |
| 6,823,230 B1 * | 11/2004 | Jamalabad et al. | ......... 700/119 |
| 7,125,512 B2 * | 10/2006 | Crump et al. | ............ 264/328.1 |

OTHER PUBLICATIONS

Rosato, D., et al., "Injection Molding Handbook (3$^{rd}$ Ed.)", Boston: Kluwer Academic Publishers, 2000, pp. 29, 147, 150, 263, 271-272, 334, 354, 445, 692-693.

* cited by examiner

Primary Examiner—Allan R. Kuhns
(74) Attorney, Agent, or Firm—Kinney & Lange, P.A.

(57) ABSTRACT

Disclosed is a method for making a prototype plastic injection molded part from a mold tool (10) built by fused deposition modeling. The mold tool (10) is built by depositing roads of a molten thermoplastic resin in layers in a predetermined pattern defined by computer file data representing the inverse of the desired prototype molded part, and is used in an injection molding machine without the addition of any reinforcement fill material or layers to create the prototype part. The disclosed method provides prototype plastic injection molded parts within a twenty-four hour time period.

19 Claims, 3 Drawing Sheets

LAYERED DEPOSITION BRIDGE TOOLING

CROSS-REFERENCE TO RELATED APPLICATIONS

This application is a United States national phase entry of PCT International Application No. PCT/US03/10219, filed on Apr. 4, 2003, which claims the benefit of U.S. Provisional Application No. 60/373,236, filed Apr. 17, 2002.

BACKGROUND OF THE INVENTION

The present invention relates to prototyping of injection molded objects, and more particularly to methods for rapidly making mold tools for use in plastic injection molding prototyping processes.

In a typical injection molding process, plastic is injected at high pressures, extremely quickly, into a thermally conductive metal mold. The molded part is quickly cooled to a temperature at which it can be removed from the mold. The part is then quickly ejected from the mold so that another part can be made, and so that the part does not become stuck on the mold (due to shrink differential). Cooling of large parts continues on a fixture. The goals of production injection modeling are to produce a high quantity of high-quality parts in a short turn-around time. A thirty second cycle time or less for the making of each molded part is typical.

In order to produce a three-dimensional object in a typical injection molding process, it is necessary to prepare a mold tool that has a cavity which is complementary to the desired shape of the three-dimensional object. The mold tool generally consists of two opposing halves, which mate together to define the mold cavity. The mold tool is normally machined out of steel or other metal which is capable of withstanding high temperature and pressure when hot liquid is injected into the mold. In use, the mold tool is inserted into a frame of an injection molding machine, and held in place with high clamping forces to oppose pressure generated inside the mold. The time and skill required to prepare the mold tool are both significant. The machining must be done by skilled craftsmen, and includes the incorporation of a sprue through which the molding material is injected, a vent, cooling lines and ejector pins. Typically, this process involves placing an order with an outside vendor and waiting several weeks or months for delivery, at high cost.

Before undergoing the expense and long lead time associated with conventional metal mold manufacturing, it is desirable to produce a prototype of the part that will have similar characteristics to the production part. The goal is produce a prototype having characteristics sufficiently close to that of the desired final manufactured part so as to permit a close prediction of part performance. Various additive process rapid prototyping (RP) technologies are commonly used to make prototype parts in the design stages of a part. These rapid prototyping technologies include fused deposition modeling (FDM), stereolithography (SLA), selective laser sintering (SLS), laminated object manufacturing (LOM) and jet technology. These additive process techniques produce prototypes useful for evaluating the fit, form and function of a part design, to gain preliminary part approval and to accelerate product development. The strength of a final production part is not, however, replicated in prototypes created by these rapid prototyping techniques. The additive processes create layers, layered stress points and voids in the part resulting in a different internal stress structure than that of the homogeneous injection-molded part. Additionally, many materials used in these processes are weak.

Various methods have been developed for creating mold tools used to make prototype injection molded parts, which may be referred to as "bridge tooling" or "temporary tooling." A number of these methods utilize rapid prototyping techniques, particularly, stereolithography. For example, U.S. Pat. No. 5,439,622 describes the use of stereolithography to form a mold shell, which is then reinforced with an incompressible material and coated with a thermally conductive material. U.S. Pat. No. 5,989,679 describes a mold tool formed by injecting a strengthening material into cavities within an object formed by stereolithography. U.S. Pat. No. 5,952,018 describes a mold tool, including an ejection valve within the mold tool, formed by stereolithography. U.S. Pat. No. 5,641,448 describes the making of a mold tool by depositing a metal coating onto a plastic mold shell produced by stereolithography.

The use of rapid prototyping to create molds for use in processes other than injection molding are also known. For example, U.S. Pat. No. 6,073,056 describes a mold built by stereolithography or fused deposition modeling used to form a vacuum cast part. U.S. Pat. No. 6,103,156 describes the making of a prototype part by pouring a thermoset into a mold formed by a rapid prototyping technique.

Techniques are also known which use a part formed a rapid prototyping process as a master mold pattern to create a prototype mold tool. For example, U.S. Pat. No. 5,189,781 describes the use of a prototype part as the pattern for making a sprayed metal mold. U.S. Pat. No. 5,707,578 uses a prototype created by stereolithography as a master mold.

A commercial process known as the Swiftool™ process uses a prototype part, which may be made by a rapid prototyping technique, as a pattern for creating bridge tooling. The process takes several days. Another commercial process known as 3D Keltool® makes bridge tooling in a period of several days in a metal-powder sintering process, starting from a master pattern made by stereolithography. Yet another commercial system called AIM™ builds mold tools by stereolithography using UV-sensitive materials.

While the above-described methods do reduce the time and expense of making mold tools, such methods nonetheless require finishing steps which can be tedious and which require additional time and skill to complete. There is a need for a more rapid and low cost method of making a mold tool which can be used to create a small number of prototype injection molded parts.

BRIEF SUMMARY OF THE INVENTION

The present invention is a method for making a prototype plastic injection molded part using a mold tool made by a fused deposition modeling technique. In one embodiment, the mold tool is built in two or more portions, wherein layers of thermally solidifiable material are deposited in a predetermined pattern according to computer file data representing the mold shape. Each mold portion includes a mold surface, a mating surface, and a base which supports the mold and mating surfaces. Together the mold portions define a mold cavity. A sprue channel and alignment holes are either formed into the mold tool as it is built, or machined into the mold tool after it is built. A vent channel may likewise be built or machined into the mold tool, or, the build process itself may be designed to result in the mold tool itself having a porosity sufficient to vent the tool. Optionally, the mold surfaces and mating surfaces may be smoothed by a vapor smoothing process to remove unintentional ridges in the surfaces. The mold tool is used in an injection molding machine, without the addition of any reinforcement fill material or layers, to create the prototype part.

In an alternate embodiment, the mold tool is made from a soluble modeling material and has a single-piece construction.

DETAILED DESCRIPTION

Figure 1:
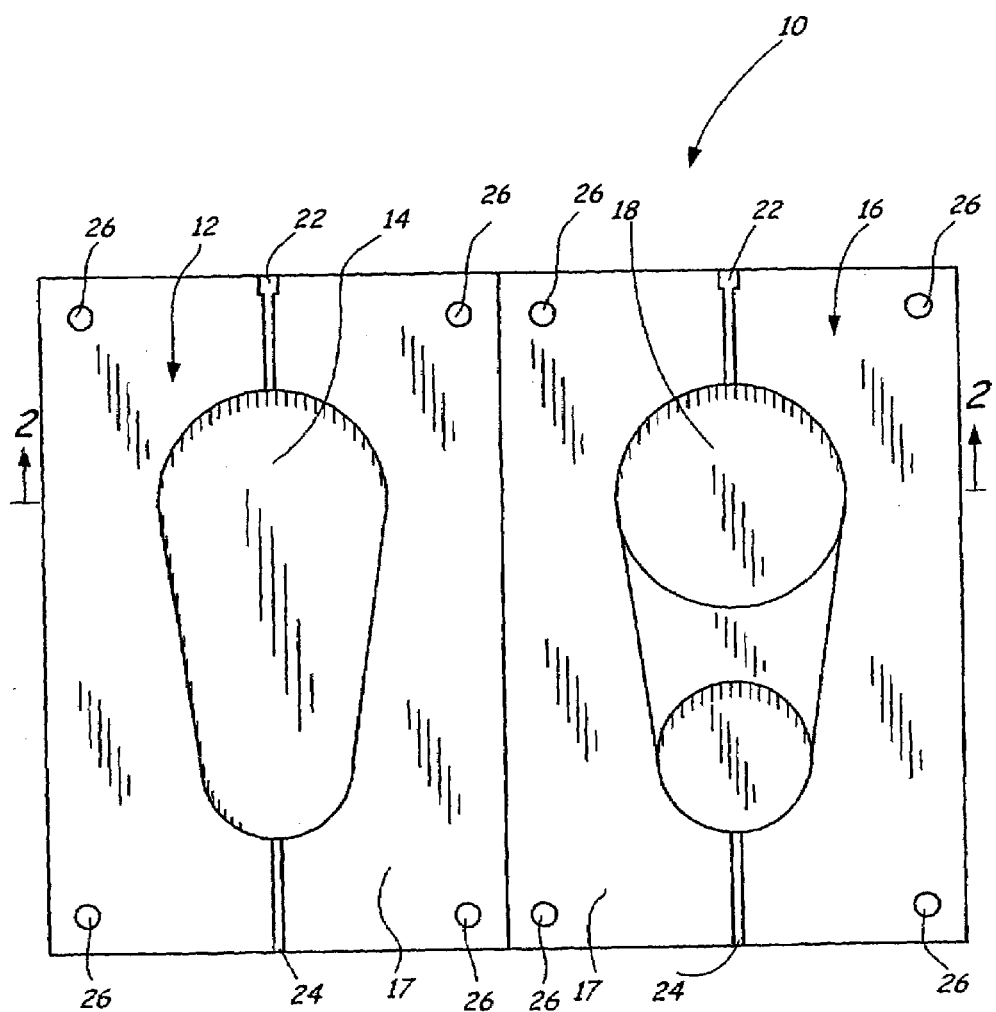
FIG. 1 is a top plan view of two mold portions of an exemplary mold tool produced by fused deposition modeling in accordance with the present invention.
Figure 2:
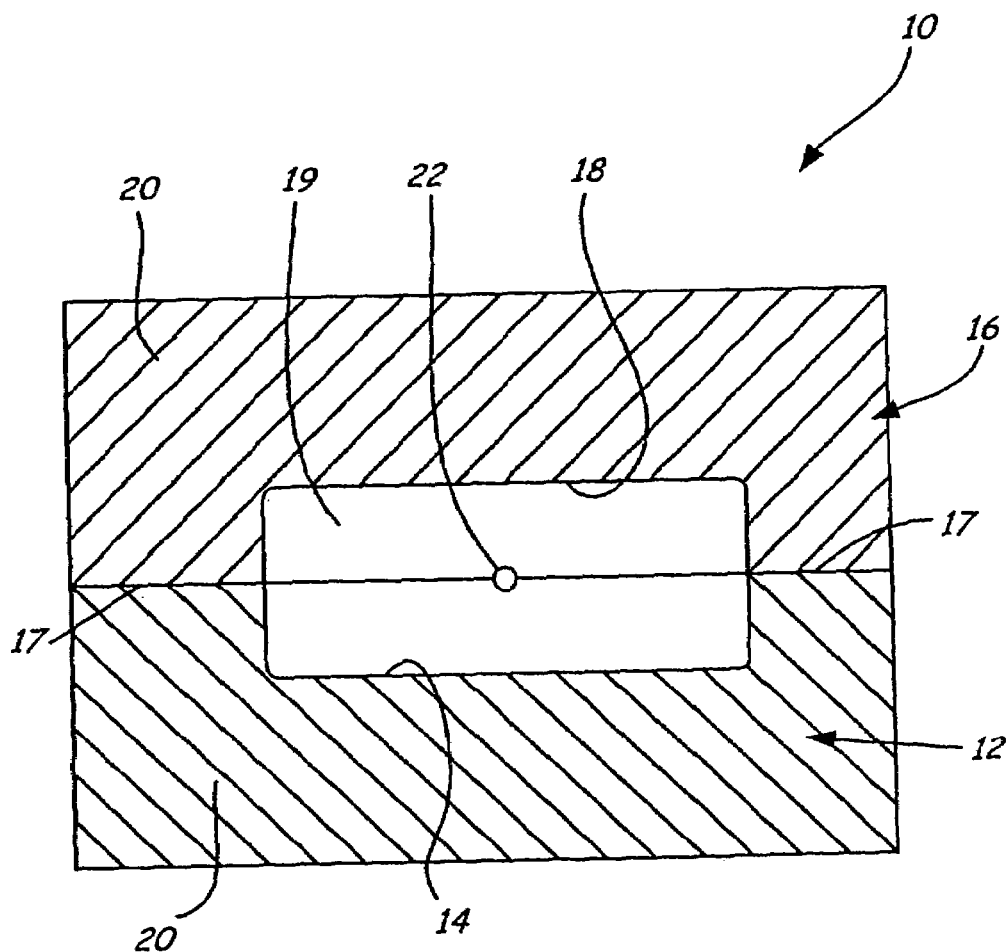
FIG. 2 is a sectional view of the mold portions of FIG. 1, taken along a line 2-2 of FIG. 1 and mated together to define a mold cavity.

FIG. 1 shows two halves of an exemplary mold tool 10 built in accordance with the present invention. A first portion 12 of mold tool 10 includes a recessed mold surface 14 corresponding to the shape of a first half of a desired prototype molded part. A second portion 16 of mold tool 10 includes a recessed mold surface 18 corresponding to the shape of a second half of the desired prototype molded part. The mold portions 12 and 16 each have a mating surface 17 and a base 20 shown in FIG. 2, which supports the mold surfaces 14 and 18 and the mating surfaces 17. When the mating surfaces 17 of the mold portions 12 and 16 are mated together as shown in FIG. 2, the mold surfaces 14 and 18 define a mold cavity 19, which has the shape of the desired prototype part. For prototype molded parts that have interior cavities, the mold tool 10 further comprises a mold core.

The mold portions 12 and 16 each also include a sprue channel 22, a vent channel 24, and four alignment holes 26. The sprue channels 22 allow for the placement of a sprue which will be inserted in a final assembly of the mold tool 10, providing a path for the injection of molten plastic into the mold cavity 19. The vent channels 24 together form a passage for the venting of gas from the mold cavity 19 when the mold tool 10 is assembled.

The alignment holes 26 receive screws or pins, which align and hold together the mold tool portions 12 and 16 in assembly of the mold tool 10. The mold tool 10 may also optionally include cooling lines for introducing a flow of coolant during an injection process.

In an alternate embodiment, a mold tool is made from a soluble modeling material and has a single-piece construction. The soluble material permits a single-piece construction, as the mold tool may be dissolved from a prototype part after the part is formed. In contrast, a mold tool made from an insoluble material is removed from a prototype part by mechanically disengaging the mold portions. A suitable soluble modeling material is an alkali-soluble material comprising a base polymer containing a carboxylic acid, and a plasticizer. The base polymer comprises a first comonomer (which contains carboxylic acid) and a second comonomer that is polymerized with the first comonomer to provide thermal and toughness properties suitable for fused deposition modeling. A preferred base polymer is comprised of methacrylic acid as the first comonomer and an alkyl methacrylate (e.g., methyl, ethyl, propyl or butyl methacrylate, and combinations thereof), preferably methyl methacrylate, as the second comonomer. A desirable amount of the acid-containing first comonomer is 15-60 weight percent of the base polymer. The base polymer is plasticized to attain rheological properties desired for the modeling process. Most preferably, the alkali-soluble thermoplastic material contains between about 84 weight percent and 74 weight percent of the base polymer and contains between about 16 weight percent and 26 weight percent of the plasticizer, and has a melt flow index of between about 5 g/10 minutes and 10 g/10 minutes under a load of 1.2 kg at 230° C. A mold tool made from the alkali-soluble material is removed from the prototype part by placing the mold tool containing the part in an alkaline bath. The alkali-soluble modeling material is the subject of co-pending U.S. patent application Ser. No. 10/019,160, International Application No. PCT/US00/10592 (published as WO 00/62994), assigned to the same assignee as the present application, and which is hereby incorporated by reference as it set forth fully herein.

The mold tool of the present invention is built by a fused deposition modeling process. Fused deposition modeling is a rapid prototyping technique that builds up three-dimensional objects in layers by extruding molten modeling material in a predetermined pattern according to computer file data representing the mold tool. The computer file data is derived from information available on the desired prototype molded part. For example, typically, the part is designed using a computer-aided design (CAD) system, and corresponding information relating to the outline of the part is derivable from a CAD file defining the desired part. A computer program designs the mold portions in accordance with the outline of the desired part, as the inverse of the desired part shape. A software program available from Moldflow Corporation will design the mold portions in this manner. A further software program "slices" the computer representation of the mold portions into horizontal layers. The modeling machine extrudes the roads of modeling material layer-by-layer, with each extruded road having a thickness equal to the height of a slice. The extruded material fuses to previously deposited material and solidifies upon a drop in temperature to form the mold portions. The mold portions may be built simultaneously in the modeling machine, or one at a time. In a preferred embodiment, the mold portions 12 and 16 are built from a polyphenylsulfone resin on a Stratasys® Titan™ FDM® fused deposition modeling machine.

The sprue channels 22, the vent channels 24, the alignment holes 26, and any cooling lines are preferably formed into the mold portions 12 and 16 as they are built. This can be done by including such features in the computer file data representing the mold tool 10. Alternatively, a sprue channel, vent channel, cooling lines and/or alignment holes may be machined into the mold portions 12 and 16 after they are built. The channels 22 and 24 and the alignment holes 26 shown in the exemplary mold tool 10 are merely one example of the placement and design of such features. Alternative designs include vertical orientation of the channels 22 and 24, and forming a single sprue channel or vent channel within one or the other of mold portions 12 and 16.

The need for a vent channel in the mold tool 10 may be avoided by controlling the extrusion pattern of the roads so that the mold tool 10 has an inherent porosity providing an open-cell matrix sufficient to vent gas from the mold cavity 19. Controlled porosity fused deposition modeling is taught in U.S. Pat. No. 5,653,925.

The mold tool 10 is formed from a thermoplastic resin that is compatible with the fused deposition modeling process and that will sustain the temperature and pressure of the injection molding process, so as to produce at least one prototype plastic injection molded part. An exemplary thermoplastic resin comprises at least 50 weight percent of a thermoplastic selected from the group consisting of polyphenylsulfone, polysulfone, polystyrene, polyphenylene ether, amorphous polyamides, polycarbonate, polyaryletherketone, acrylics (e.g., methyl methacrylate), nylon, poly(2-ethyl-2-oxazoline), and blends thereof. The thermoplastic resin may contain various fillers, additives and the like, as will be understood by those skilled in the art. A particularly preferred thermoplastic for use in creating a mold tool in accordance with the present invention is a polyphenylsulfone-based resin. One such thermoplastic comprises polyphenylsulfone blended with between about 2-20 weight percent polycarbonate (preferably near 10 percent).

Figure 3:
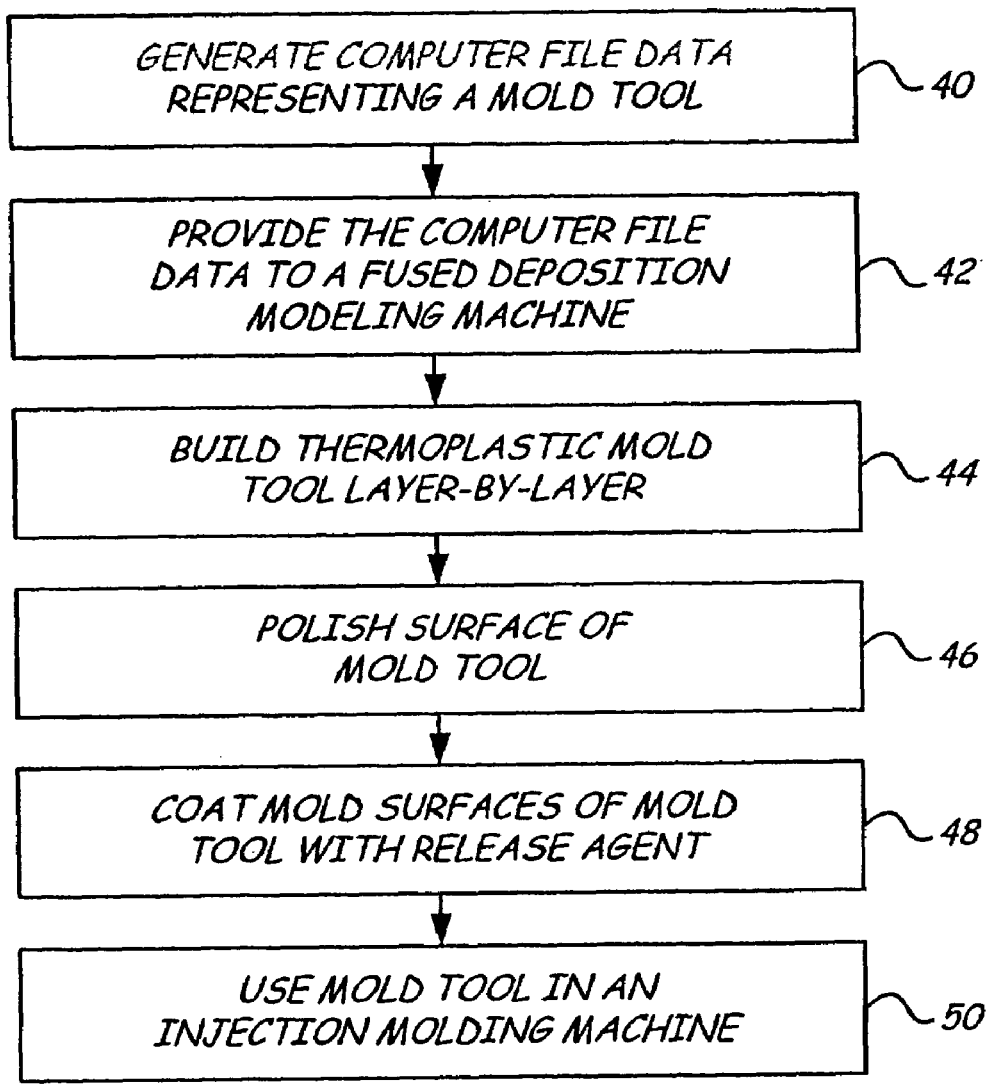
FIG. 3 is a flow diagram of the process of making a prototype injection molded part using a mold tool built in accordance with the present invention.

FIG. 3 shows a flow diagram which summarizes the method of producing a prototype injection molded part in accordance with the present invention. A CAD tool is used to generate computer file data representing a mold tool, in step 40. The data is provided to a fused deposition modeling machine, in step 42. The mold tool is built in the fused deposition modeling machine, in layers defined by the computer file data, in step 44. In an optional step 46, the mold surfaces and/or mating surfaces of the mold tool are smoothed to remove ridges unintentionally created in the formation of the mold tool. In a preferred embodiment, the smoothing is done by a vapor smoothing process, which is the subject of International Application No. PCT/US03/089218 entitled "Smoothing Method For Layered Deposition Modeling", W. Priedeman and D. Smith, filed on even date herewith, assigned to the same assignee as the present application, and incorporated by reference as if set forth fully herein. As is taught in said co-pending application, certain mold features may be identified for solvent masking or for pre-distortion prior to the vapor smoothing step, and the computer file data representing the mold tool may include data identifying said features. Alternative smoothing techniques include sanding, grinding, and thermal ironing.

The mold surfaces of the mold tool are then coated with a release agent, in a step 48. Suitable release agents include dry film lubricants, and others that will be recognized by those skilled in the art. If needed, sprue and vent channels and alignment holes are machined into the mold tool prior to step 48. A final step 50 is to perform injection molding using the mold tool. The mold tool is assembled in an injection molding machine, without the addition of any reinforcement fill material or layers.

Using the method of the present invention, a prototype plastic injection molded part can be produced within a 24-hour time period.

Although the present invention has been described with reference to preferred embodiments, workers skilled in the art will recognize that changes may be made in form and detail without departing from the spirit and scope of the invention.

The invention claimed is:

1. A method for making a prototype plastic injection molded part, comprising the steps of:
   providing computer file data representing a mold tool;
   building the mold tool by depositing roads of a molten thermoplastic resin in layers in a predetermined pattern defined by the computer file data, the mold tool defining a mold cavity; and
   using the mold tool in an injection molding machine, without the addition of any reinforcement fill material or layers, to create the prototype part by injection molding of plastic.

2. The method of claim 1, wherein the thermoplastic resin comprises at least about 50 weight percent of a thermoplastic selected from the group consisting of polyphenylsulfone, polysulfone, polystyrene, polyphenylene ether, amorphous polyamides, polycarbonate, acrylics, nylon, poly(2-ethyl-2-oxazoline), and blends thereof.

3. The method of claim 1, wherein the thermoplastic resin is a polyphenylsulfone-based resin.

4. The method of claim 1, wherein a sprue channel and alignment holes are formed into the mold tool as it is built.

5. The method of claim 1, and further comprising the step of:
   machining a sprue channel into the mold tool, prior to the step of using the mold tool in an injection molding machine.

6. The method of claim 1, and further comprising the step of:
   machining a plurality of alignment holes into the mold tool, prior to the step of using the mold tool in an injection molding machine.

7. The method of claim 1, wherein the predetermined pattern results in the mold tool having a porosity sufficient to vent gas in the mold cavity generated by injection of the plastic.

8. The method of claim 1, wherein a vent channel is formed into the mold tool as it is built.

9. The method of claim 1, and further comprising the step of:
   machining a vent channel into the mold tool, prior to the step of using the mold tool in an injection molding machine.

10. The method of claim 1, and further comprising the step of:
    coating surfaces of the mold cavity with a release agent prior to the step of using the mold tool in an injection molding machine.

11. The method of claim 1, wherein the step of building the mold tool comprises building two or more mating mold portions, each mold portion having a mold surface, a mating surface, and a base which supports the mold and mating surfaces, the mold surfaces together defining the mold cavity.

12. The method of claim 11, and further comprising the step of:
    smoothing surfaces of the mold tool prior to the step of using the mold tool in an injection molding machine.

13. The method of claim 11, wherein the step of building the mold tool further comprises building a mold core.

14. The method of claim 13, and further comprising the step of:
    assembling the mold core in the mating portions of the mold tool-prior to the step of using the mold tool in an injection molding machine.

15. The method of claim 14, wherein the thermoplastic resin forming the mold core is an alkali-soluble thermoplastic, comprising a base polymer containing between about 15 weight percent and 60 weight percent of a carboxylic acid, and a plasticizer, and further comprising the step of:
    dissolving the mold core from the prototype part.

16. A method for making a prototype plastic injection molded part, comprising the steps of:
    providing computer file data representing a mold tool;
    building the mold tool by depositing roads of a molten soluble thermoplastic resin in layers in a predetermined pattern defined by the computer file data;

using the mold tool in an injection molding machine, without the addition of any reinforcement fill material or layers, to create the prototype partby injection molding of plastic; and dissolving the mold tool to release the prototype part.

17. The method of claim 16, wherein the soluble thermoplastic resin is an alkali-soluble thermoplastic comprising:
a base polymer containing between about 15 weight percent and 60 weight percent of a carboxylic acid, and a plasticizer.

18. The method of claim 17, wherein the carboxylic acid is methacrylic acid and wherein the base polymer further contains an alkyl methacrylate.

19. The method of claim 18, wherein the alkyl methacrylate is methyl methacrylate and wherein the base polymer contains between about a 1:1 to a 1:2 weight percent ratio of methacrylic acid to methyl methacrylate.

* * * * *

UNITED STATES PATENT AND TRADEMARK OFFICE
CERTIFICATE OF CORRECTION

| | | |
|---|---|---|
| PATENT NO. | : 7,255,821 B2 | Page 1 of 1 |
| APPLICATION NO. | : 10/511783 | |
| DATED | : August 14, 2007 | |
| INVENTOR(S) | : William R. Priedeman, Jr. et al. | |

It is certified that error appears in the above-identified patent and that said Letters Patent is hereby corrected as shown below:

Column 4, Line 18, delete "as it set", insert --as if set--

Column 7, Line 3 Claim 16, delete "partby", insert --part by--

Signed and Sealed this

Twentieth Day of November, 2007

JON W. DUDAS
*Director of the United States Patent and Trademark Office*